(12) United States Patent
Duncan

(10) Patent No.: US 6,453,601 B1
(45) Date of Patent: *Sep. 24, 2002

(54) FISH HOOK REMOVER

(76) Inventor: Franklin R. Duncan, E. 11205 4th Ave., Spokane, WA (US) 99206

( * ) Notice: Subject to any disclaimer, the term of this patent is extended or adjusted under 35 U.S.C. 154(b) by 0 days.

This patent is subject to a terminal disclaimer.

(21) Appl. No.: 09/702,200

(22) Filed: Oct. 30, 2000

Related U.S. Application Data

(63) Continuation-in-part of application No. 09/344,006, filed on Jun. 25, 1999, now Pat. No. 6,138,401.

(51) Int. Cl.⁷ ............................................... A01K 97/18
(52) U.S. Cl. ......................................... 43/53.5; 81/488
(58) Field of Search .......................................... 43/53.5

(56) References Cited

U.S. PATENT DOCUMENTS

| 1,957,799 | A | * | 5/1934 | Peterson | 43/53.5 |
| 2,176,330 | A | * | 10/1939 | De Beuckelaere | 43/53.5 |
| 2,441,458 | A | * | 5/1948 | Underwood | 43/53.5 |
| 2,781,599 | A | * | 2/1957 | Steiner | 43/53.5 |
| 2,887,817 | A | * | 5/1959 | Sharpe | 43/53.5 |
| 3,011,286 | A | * | 12/1961 | Wallace | 43/53.5 |
| 3,377,735 | A | * | 4/1968 | Daughtry | 43/53.5 |
| 3,713,243 | A | * | 1/1973 | Tetzner | 43/53.5 |
| 4,127,957 | A | * | 12/1978 | Bourquin, et al. | 43/53.5 |
| 4,914,853 | A | * | 4/1990 | Swindle | 43/53.5 |
| 5,644,865 | A | | 7/1997 | Harrison et al. | 43/53.5 |
| 6,138,401 | A | * | 10/2000 | Duncan | 43/53.5 |
| 6,272,788 | B1 | * | 8/2001 | Bergacker | 43/53.5 |

OTHER PUBLICATIONS

"Cabela's Long Arm Lure Retriever," Cabela's Spring Annual Catalog 99, p. 45.

* cited by examiner

Primary Examiner—Peter M. Poon
Assistant Examiner—Joan Olszewski
(74) Attorney, Agent, or Firm—Reidlaw, L.L.C.; John S. Reid

(57) ABSTRACT

A fish hook remover is described which provides a shank that can include a handle. The shank has a spiral hook engaging flight. The spiral hook engaging flight is generated about an axis with a central hook shank receiving opening. A spiral line guide opening is defined by the flight that spirals into the central hook shank receiving opening such that a fish line engaged laterally by the flight will be guided into the central hook shank receiving opening.

19 Claims, 8 Drawing Sheets

FISH HOOK REMOVER

CROSS REFERENCE TO RELATED APPLICATIONS

This application is a continuation-in-part of U.S. patent application Ser. No. 09/344,006, filed Jun. 25, 1999, now U.S. Pat. No. 6,138,401, issued Oct. 31, 2000.

FIELD OF THE INVENTION

This invention pertains to removal of fish hooks from fish and more particularly to a device for accomplishing such removal.

BACKGROUND OF THE INVENTION

There is an increasing effort on the part of many sports fishermen to release caught fish. However, many species are very fragile and can easily die if removed from the water and handled roughly for the purpose of removing hooks. Barbless hooks have been used to ease the removal effort and to minimize injury to released fish. However many fish still die from exposure to air and extended handling during the hook removal process.

In an attempted solution to the problem, hook removers have been developed to minimize the time and efforts required to remove hooks. While some have indeed helped save many fish, the time required for hook removal is still significant, as is required handling of the fish.

An exemplary improved hook remover is disclosed in U.S. Pat. No. 5,644,865; granted on Jul. 8, 1997 to Harrison et al. The Harrison hook remover includes a handle with a slotted tubular structure at one end. The tube configuration is angularly oriented to the handle and the slot, which extends the full length of the tube, opens along a flat line guide surface that is formed into the handle.

The Harrison tube is circular in cross section and, in at least one commercial version, is approximately ¾ inch long. The bore within the tube is approximately ⅛ inch in diameter. Thus the bore dimension is significantly less than the tube length (approximately 17% of the tube length). While the device is functional, the small bore diameter, long tube length, orientation and shape of the slot, and the single line guide surface lead to difficulties in use.

Firstly, the circular nature of tube and the slot length, and the singular line guide surface contribute to difficulties in attaching the remover to a fish line. The line must be tight and straight in order to be received in the long, straight slot. Further, the device must be accurately oriented in relation to the line for the guide surface and slot to properly receive the line. This means the line must be held tight, usually by one hand, and either the line or the hook remover must be maneuvered into the right orientation for engagement with the single line guide surface before the line can be guided into the tubular section. This is not an easy task especially if the fish is fighting to be free.

Secondly, the small diameter of the tube bore will not accept many different size fly bodies or hook sizes. Since the tube bore is intended to be slidably received over the hook shank (and fly body in the case of a fishing fly), separate size removers become advisable for different size hooks and flies. This becomes an inconvenience for those who fish with different size hooks and flies.

Thirdly, the straight axial slot in the tubular member requires that the fisherman be careful not to line up the slot with the bend of the hook, because the tube could easily slide off the hook during the thrust required to disgorge the hook barb and require re-threading of the line onto the tubular member. The hook would remain in the fish, the end of the remover could gouge into the fish, and the user would be required to once again thread the remover onto the fish line and repeat the removal effort. All this significantly increases the possibility that the fish will be injured.

Even with the above disadvantages, the Harrison hook remover represents an improvement over the older style long nose pliers, and bulbous plastic hook disgorges that were used in the past. Still, it is obvious that further improvements are desirable.

Aside from removing hooks from fish, forms of removal tools have been developed for removing hooks from submerged objects such as logs. One such device is a lure retriever that includes an elongated helical-spiral wire is mounted at the end of an extendable pole. To remove a hook from a submerged object, the user turns the spiral end around the fish line, then slides the end along the line to the lure. A thrust of the device serves to dislodge the hook. Upon retrieval, the user must unwind the line or lure from the wire. This device would not be serviceable for catch and release hook removal from fish, mainly because the wire must be turned around the line; and the long shaft, being substantially coaxial with the helical spiral is not conducive to hook removal from fish.

As a solution to the above problematic issues, the present invention has for an objective, provision of a hook remover that is easy and reliable for use in quickly removing hooks from fish.

Another object is to provide such a hook remover that can be used on a wide variety of hook and fly sizes.

A further objective is to provide such a hook remover that cannot be easily removed from the line during a thrusting motion to remove the hook or from angling the remover to dislodge the hook.

These and still further objectives and advantages may become apparent from the following description of preferred embodiments of my invention.

SUMMARY OF THE INVENTION

The present invention includes a fish hook remover having a shank and a spiral hook engaging flight on the shank. The spiral flight is generated about an axis offset from the shank through an angle greater than 360°. The spiral flight is generated from the shank to and enclosing an inner end. The spiral flight includes a forward surface and a rearward surface axially spaced by a width dimension. The spiral configuration of the flight defines a central hook shank receiving opening formed about the axis and having a cross sectional dimension measured normal to the axis. The inner end is spaced radially from and located along the axis within the spiral flight. The flight includes an integral line guide surface leading tangentially into the central hook shank receiving opening such that a fish line engaged by the line guide surface can be guided into the central hook shank receiving opening.

The invention also includes a fish hook remover having two opposed spiral flights. The fish hook remover has a shank and a first spiral hook engaging flight on the shank. The first spiral flight is generated about a first axis offset from the shank through an angle greater than about 250° and extending to a first spiral flight inner end. The first spiral flight defines a first spiral flight outer surface. The first spiral flight further defines a first central hook shank receiving opening formed about the first axis and defined by the spiral configuration of the first spiral flight. The first spiral flight inner end is spaced radially from and located along the first axis within the first spiral flight. The fish hook remover further includes a second spiral hook engaging flight on the shank, generated about a second axis offset from the shank through an angle greater than about 250°. The second spiral flight extends to a second spiral flight inner end, and further defines a second spiral flight outer surface. The second spiral flight also defines a second central hook shank receiving opening formed about the second axis, and defined by the spiral configuration of the second spiral flight. The second spiral flight inner end is spaced radially from and located along the second axis within the second spiral flight. As the spiral flights are generated about their respective axes, the first spiral flight outer surface and the second spiral flight outer surface pass in proximity to one another to define a line guide opening leading into the first and second central hook shank receiving openings.

The invention also provides for a fish hook remover having a one spiral within another spiral. The fish hook remover has a shank and a first spiral hook engaging flight on the shank. The first spiral flight is generated about a first axis offset from the shank through an angle greater than about 250° and extending to a first spiral flight inner end. The first spiral flight defines a first spiral flight inner surface. The hook remover further includes a second spiral hook engaging flight on one of the shank or the first spiral flight, and generated about a second axis offset from the shank through an angle greater than about 250°. The second spiral flight extends to a second spiral flight inner end, the second spiral flight defining a second spiral flight outer surface. The second spiral flight defines a central hook shank receiving opening formed about the second axis and defined by the spiral configuration of at least the second spiral flight. The first spiral flight inner end is spaced radially from and located along the first axis within the first and second spiral flights. As the spiral flights are generated about their respective axes, the first spiral flight inner surface and the second spiral flight outer surface define a line guide opening leading into the central hook shank receiving opening.

DESCRIPTION OF THE DRAWINGS

Preferred embodiments of the invention are described below with reference to the following accompanying drawings.

DETAILED DESCRIPTION OF THE INVENTION

Figure 1:
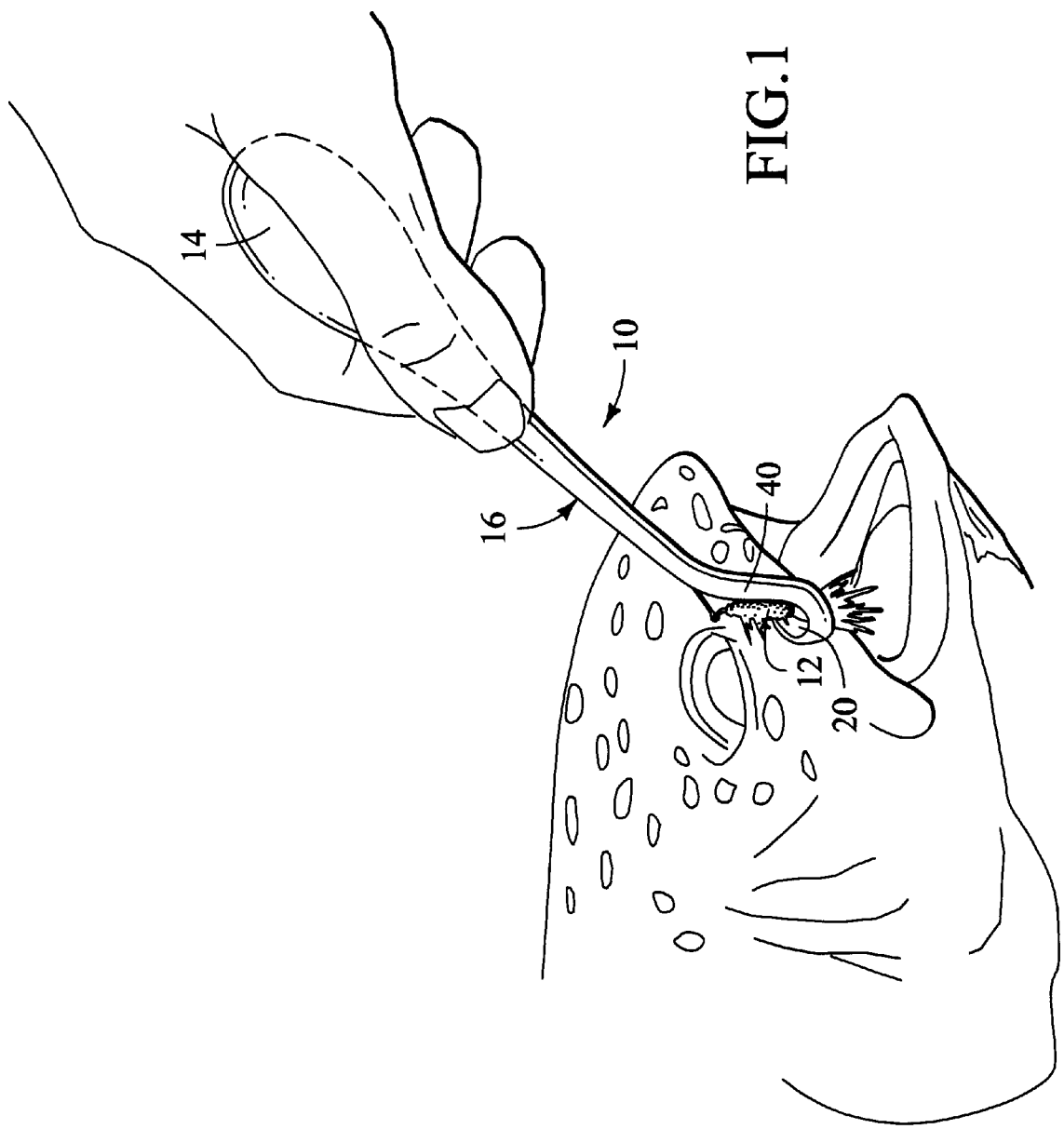
FIG. 1 is a perspective view showing a preferred form of a fish hook remover of the present invention in operation.

A fish hook remover, several embodiments of which are shown in the accompanying drawings, is designated here and within the drawings by the reference numeral 10. The purpose of the present fish hook remover 10 in any of the exemplified forms, is to enable quick and effective removal of a fish hook 12 from a fish (FIG. 1).

It is preferred that forms of the present hook remover 10 be formed of metal by casting processes. Preferred metals include steel (most preferably stainless steel) or bronze, though other materials can be used. Stainless steel is preferred for strength and its capability to resist corrosion. Bronze is preferred for salt water use. In either situation, the particular configurations illustrated are preferably molded, using conventional casting techniques.

In preferred embodiments, the present hook remover 10 generally includes a handle 16 with a hand grip section 14 (FIG. 1) at a rearward end and a shank 40 at a forward end. A spiral flight 18 on the handle is generated about an axis A (FIGS. 2 and 3) through an angle that is greater than approximately 360°. The flight can be made integral with the handle 16 and be formed in a flat or somewhat rounded configuration to be complimentary to the curve of a fish hook.

The spiral flight 18 is wrapped on itself to define a central hook shank receiving opening 20 having an effective cross sectional dimension D (FIG. 3) that is normal to the axis A. The size of the central hook shank receiving opening 20 can be varied according to need. Hook removers 10 with larger central openings can be produced for use with large tackle, smaller for small tackle. However a single size can be made that will be serviceable for a wide size range of tackle. In one example, an opening size of approximately ¼ inch will accommodate a range of hooks from size 20 to size 2 or larger, since the upper limit is determined only by the line and hook shank size.

A line guide opening 22 (FIG. 3) is defined by the flight 18 and is formed according to the spiral shape of the flight. The line guide opening extends from an outward open end 24 proximate the handle to an inward end 26 that opens into the central hook shank receiving opening 20. The outward end 24 is preferably substantially parallel to the handle 16 (more specifically toward a shank portion 40 of the handle) to receive a fish line by way of a simple lateral movement of the hook remover toward a fish line.

The distance between "wraps" of the flight 18 defines the radial dimension of the line guide opening 22, which is preferably approximately consistent between the ends 24, 26. This distance is necessarily greater than the fish line diameter, but need not be greater than the diameter of the shank of a hook to be removed.

In the preferred embodiments, the flight 18 spans an axial distance "W" (FIG. 2) between a forward surface 28 and a rearward surface 30 that is less than the effective cross sectional dimension "D" (FIG. 3) of the hook shank receiving opening 20. This relationship significantly simplifies attachment of the flight to a fish line. Even relatively limp, curled line can be easily captured since there is no long slot for the user to align with a straight section of line.

Further, the flights 18 of preferred embodiments include line guide surfaces 32 that lead in the spiral configuration tangentially (FIG. 3) into the central hook shank receiving openings 20. A fish line engaged laterally (with respect to the long dimension of the line) by a guide surface 32 can be easily and smoothly guided into the central hook shank receiving opening 20 by simple, short lateral movement of the hook remover. The flight surface opposite the line guide surface will also help accomplish this function, as can surface portions of the handle adjacent to the flight and outward end 24 of the line guide opening 22.

It is noteworthy that a fish line can be received within the central hook shank opening 20 without requiring rotation of the hook remover.

To achieve the above function, and yet prevent unintentional disengagement of the line, preferred embodiments of the present hook remover 10 include flights 18 that extend in a spiral configuration with respect to axis A, through an angle greater than 360°. In preferred aspects, the angle is greater than 360° but less than 720°.

Figure 3:
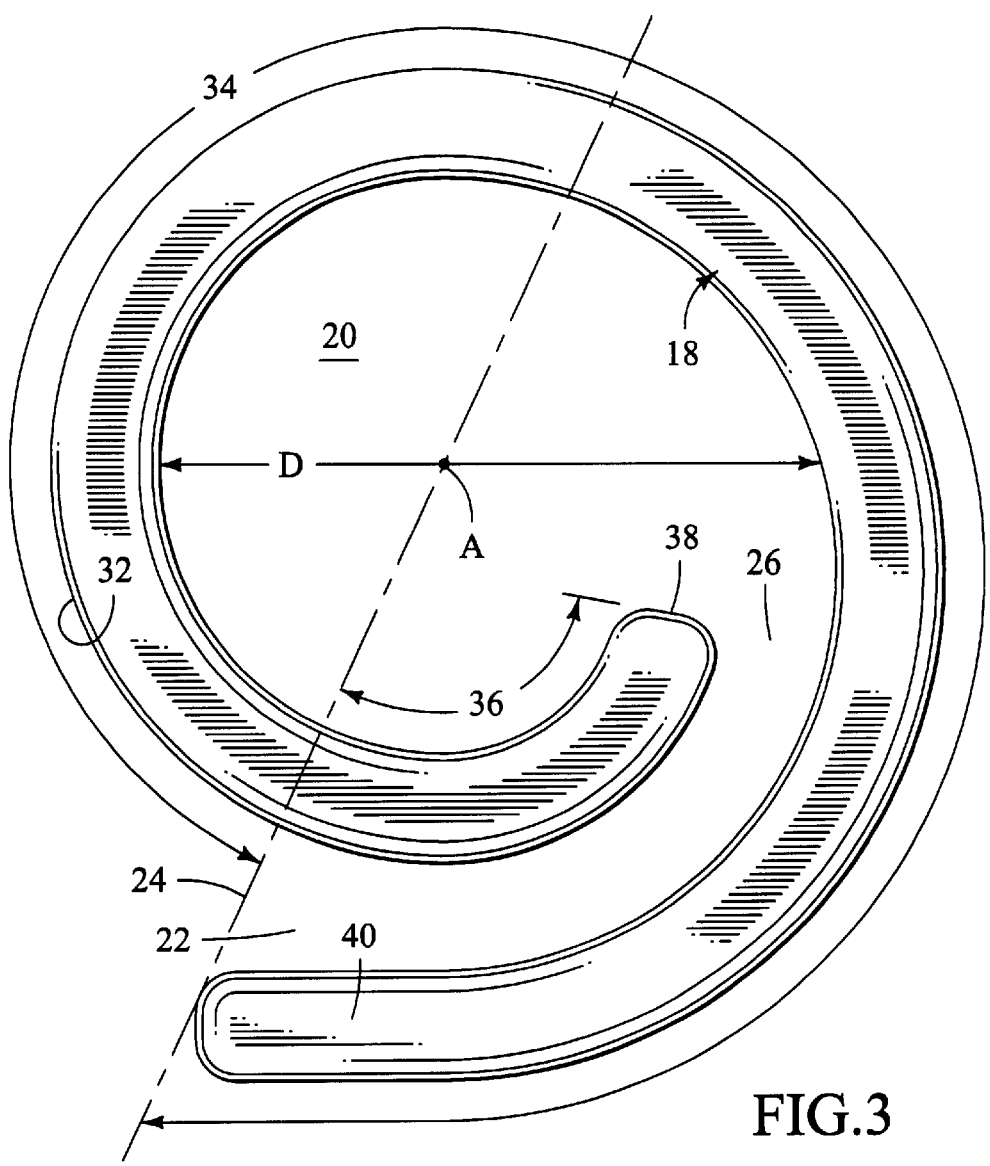
FIG. 3 is an enlarged end view of the fish hook remover depicted in FIG. 2.

FIG. 3 best demonstrates the above parameters. In the illustrated example, the flight 18 extends as a spiral about the axis A with a first spiral coil section 34 angularly spanning 360° about the axis starting from the outward open end 24 proximate the handle 16. A second spiral coil section 36 is integral with the first coil section 34 and extends therefrom and in the same direction about the axis A from the first coil section 34 through an angle less than 360° to a free end 38.

In the illustrated example, the second section 36 includes an angle about the axis A of approximately 80°, thereby extending the entire flight through an angle to the free end 38 of 440° (first section 34 being 360° plus 80° for the second section 36). Thus the line must only traverse a short lateral distance (relative to the remover 10) from the open outward end 24 of the line guide opening 22 to exit through the inward end 26 and into the central opening 20.

If the second spiral coil section 36 spans a greater angular distance, more lateral movement of the line will be required as the distance from the outward open end 24 to the inward end 26 will be increased. Still, even if the second section approaches 360° to the free end 38 (making the total angular displacement of the spiral approach 720°), a line can be attached without requiring rotation of the remover about the line. However, further extension of the second section (bringing the total angle beyond 720°) will typically require that the remover be rotated to capture the fishing line and reverse rotation will be required to release the line from the fish hook remover.

In one aspect, the flight is formed in such a manner that it over-wraps itself. In other words, the first coil section 34 at least partially overlaps the second coil section 36 along the axis A. In fact it is possible that the forward and rearward surfaces 28, 30 are formed to lie in substantially parallel planes, and that such planes are normal to the axis A. This is not necessary, but it is desirable to avoid a helical configuration along the axis.

Figure 8:
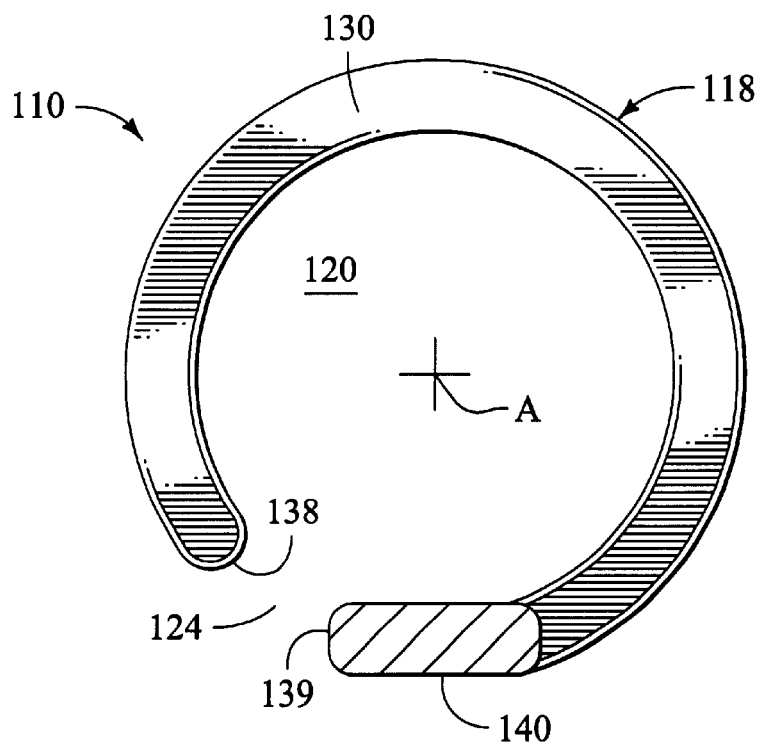
FIG. 8 is a top sectional view of another embodiment of a fish hook remover in accordance with the present invention.

More specifically, in one embodiment of the invention the spiral flight does not form a spiral with overlapping portions. Referring to FIG. 8, a modified fish hook remover 110 is depicted. The view is a top sectional view through the shank 40 such that the rearward surface of the spiral 118 is view from the top. The hook remover 110 includes a modified spiral segment 118. The spiral segment 118 is generated about the axis A from the shank portion 140 through to the free end 138. The spiral can be generated about the axis A at a constant radius from the axis A, or a reducing radius such that the free end 138 is closer to the axis A than is the shank 140. When the spiral is generated at a constant radius, the result is a circular segment. Likewise, the spiral segment can be generated in the shape of an elliptical segment, or other shapes. Thus, when I use the expression "spiral segment" I mean to include not only reducing radius segments, but other geometries as well. Preferably, the radius of the segment 118 is constant or less at the free end 138 than at the shank end 139, which reduces the chances for the line and hook shank to slip out of the hook shank receiving opening 120 through the outward open end 124. Preferably, the spiral segment 118 is generated about an angle of at least 270°, and more preferably about 340°.

Figure 4:
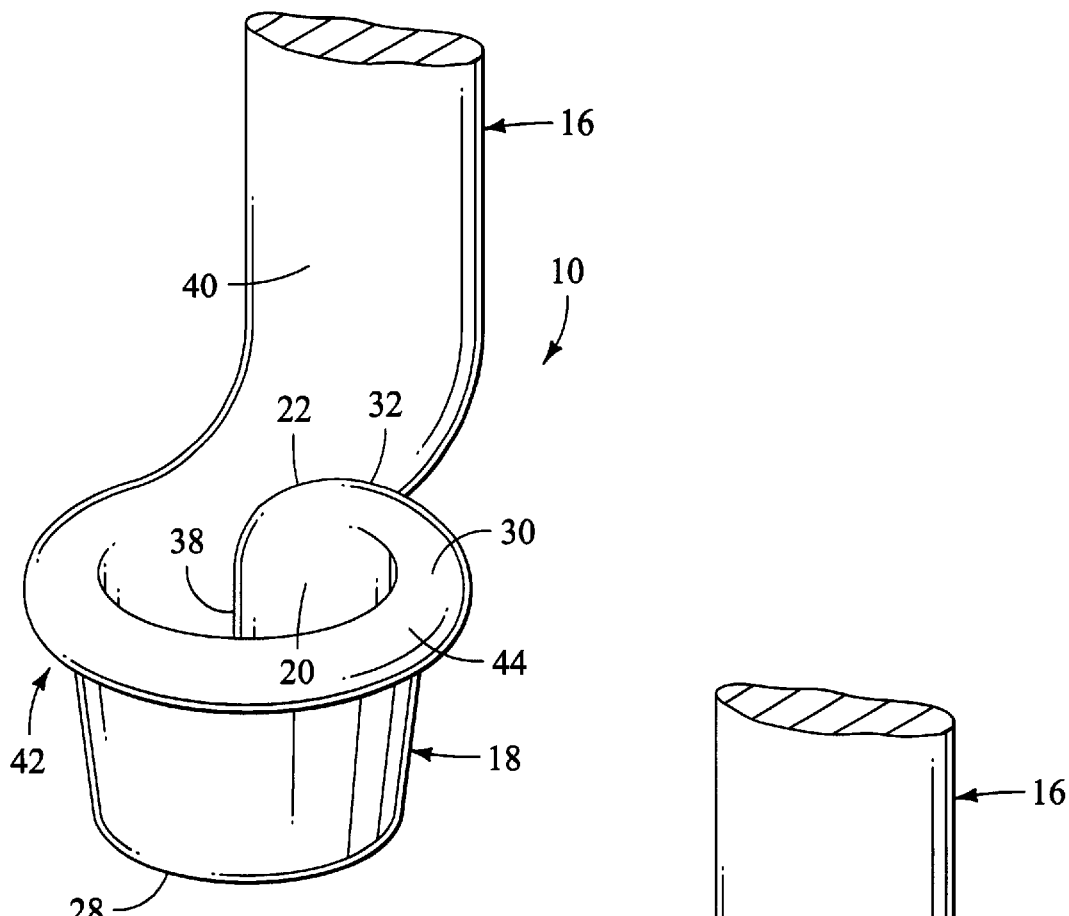
FIG. 4 is a fragmented view of another preferred form of the present fish hook remover.
Figure 5:
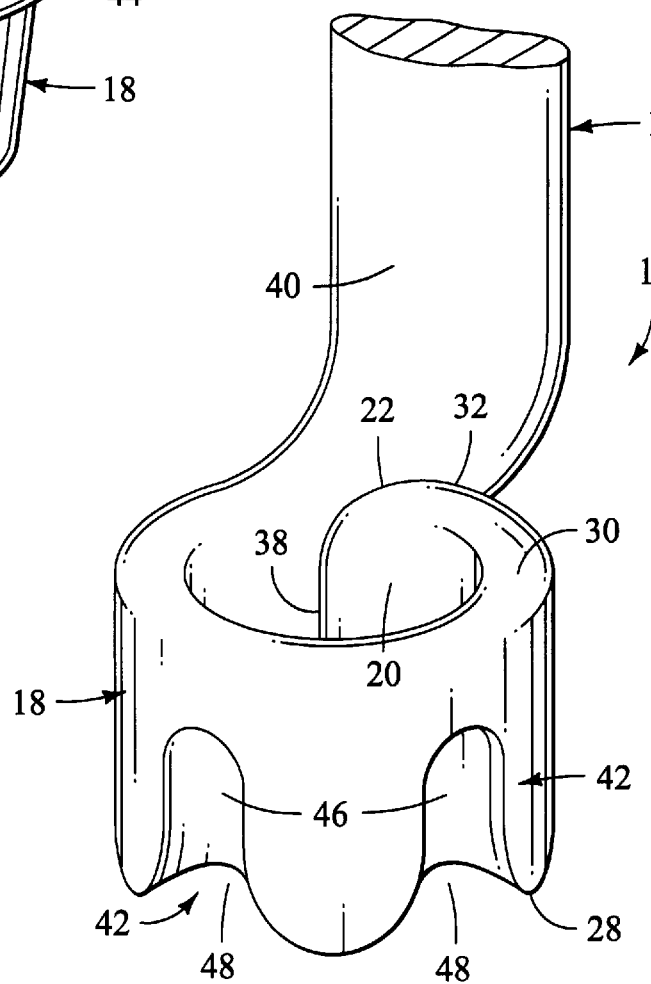
FIG. 5 is a fragmented view of a further preferred form of the present fish hook remover.

As depicted in FIGS. 3–5, the spiral flight 18 is generated in a counter-clockwise direction about the axis A, beginning at the shank 40 and ending at the free end 38, and when viewed from the rearward surface 30 (FIGS. 4 and 5). This design is particularly suited for right-handed persons to use the fish hook remover since the line will typically be approached from the right side and can thus enter the outward open end 24 (FIG. 3) located towards the left side of the flight 18. Accordingly, for left handed persons, the spiral flight 18 can be generated about the axis A in a clockwise direction, beginning at the shank 40 and ending at the free end 38, and when viewed from the rearward surface 30.

Figure 9:
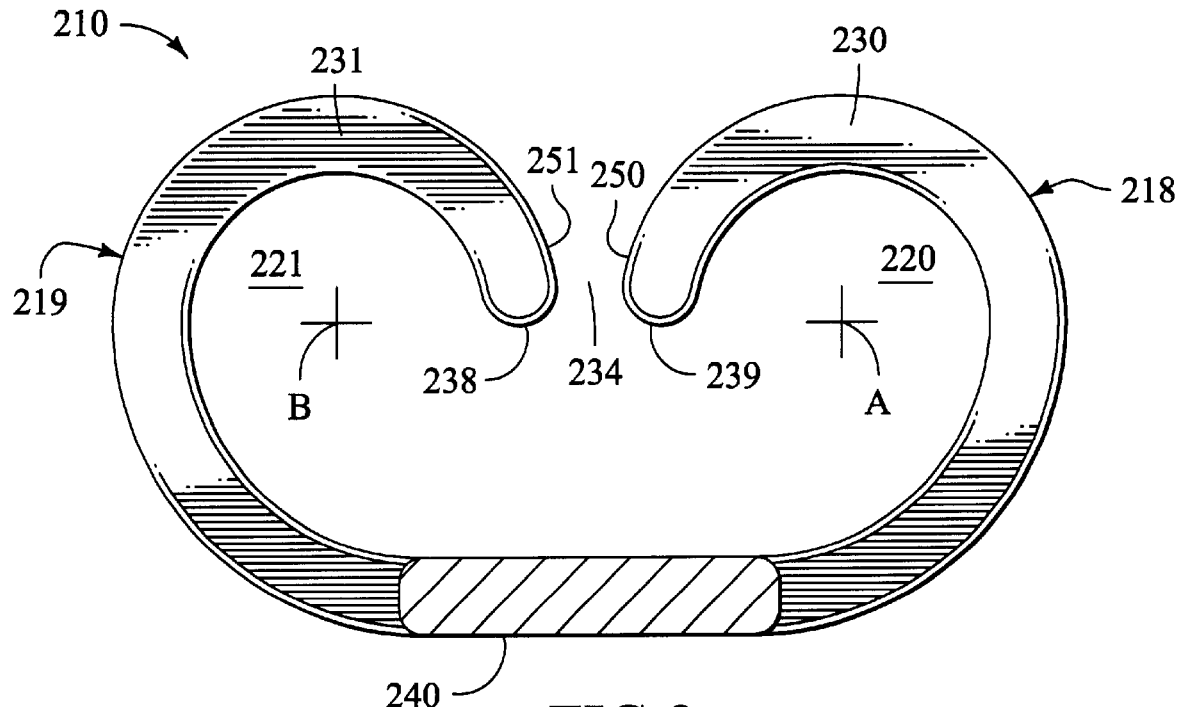
FIG. 9 is a top sectional view of an embodiment of a fish hook remover in accordance with the present invention having two opposed spiral flights.

In one embodiment of the invention depicted in FIG. 9, a hook remover 210 which can be used by both left and right handed persons is shown. The view shown in FIG. 9 is a sectional view through the shank 240 such that the spirals 218 and 219 show the respective rearward surfaces 230 and 231 in a top view. As indicated, the hook remover 240 comprises a first spiral 218 which is generated in a counter-clockwise direction (as viewed from the top) about a first axis A, beginning at the right side of the shank end 240 and ending at the first free end 239. The hook remover 240 further comprises a second spiral 219 which is generated in a clockwise direction (as viewed from the top) about a second axis B, beginning at the left side of the shank end 240 and ending at the second free end 238. Preferably, each spiral is generated about its respective axis for at least about 240°. By decreasing the radius of the spirals as they are generated about their respective axes, the spirals can be generated over an angular distance of 360° or more. Preferably, neither spiral is generated over an angular distance of about 540°. The first spiral 218 defines a first hook shank receiving area 220, while the second spiral 219 defines a second hook shank receiving area 221. The inward portions 250 and 251 of respective spirals 218 and 219 pass in proximity to one another to define a line receiving opening 224 which can receive a fishing line. In this way, the first spiral 218 can be used by right handed persons, as described above, while the second spiral 219 can be used by left handed persons.

In preferred forms of the present hook remover, the handle includes a shank 40 at a forward end of the hand grip section 14 of the handle. It is advantageous that the shank part 40 be oriented at an obtuse angle to the handle, as indicated by the angle Z in FIG. 2. The angle Z can be from about 70 degrees to about 180 degrees, but is preferably about 120 degrees to about 160 degrees. Further, the angle Z does not need to be at the handle/shank junction, but can be within the shank itself, or the handle itself. It is also preferred that the spiral hook engaging flight 18 be formed on the shank 40, generated about the axis A which is substantially parallel to and offset from the shank 40. As shown, at least part of the forward surface 28 of the spiral flight 18 is disposed in a plane that is approximately perpendicular to the shank section (see the angle P in FIG. 2). The angled shank 40 facilitates application of leverage for hook removal. The offset orientation of the spiral flight 18 is provided to keep the hand grip 14 and shank 40 clear of the fish line to facilitate capture of the line and sliding of the spiral flight along the line without interference by the user's hand.

It is also pointed out that the shank part 40 and flight 18 can be produced separately from the hand grip 14. Such a configuration can enable attachment of the shank and flight to numerous forms of hand grips, either for utilitarian or decorative purposes.

Figure 2:
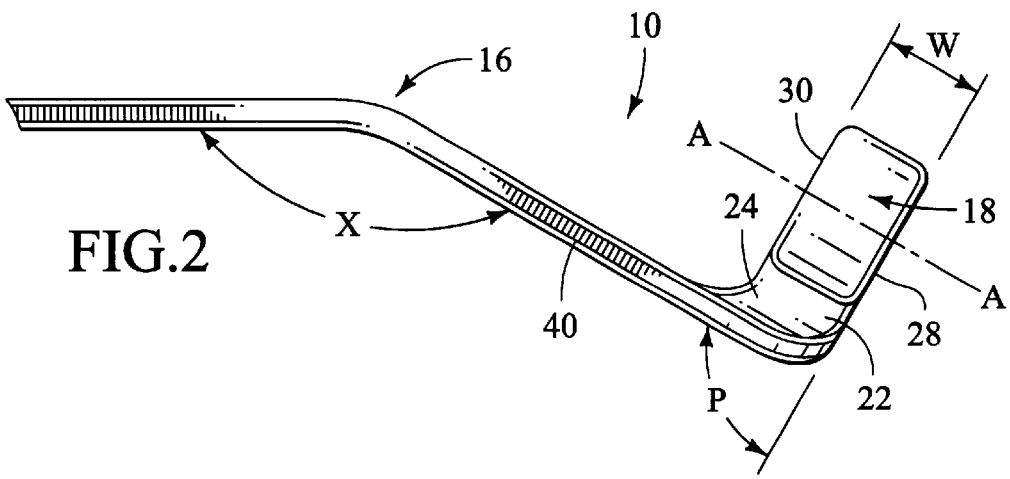
FIG. 2 is a fragmented side elevational view of the form shown in FIG. 1.
Figure 10:
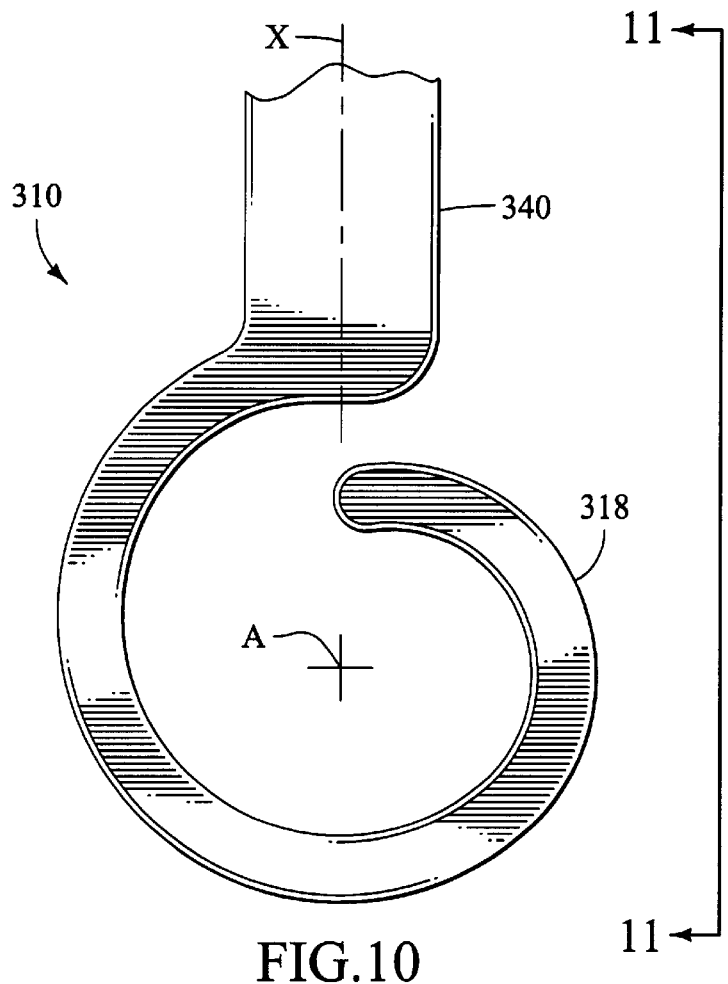
FIG. 10 is a front view of an embodiment of a fish hook remover in accordance with the present invention wherein the spiral flight is aligned with the shank.
Figure 11:
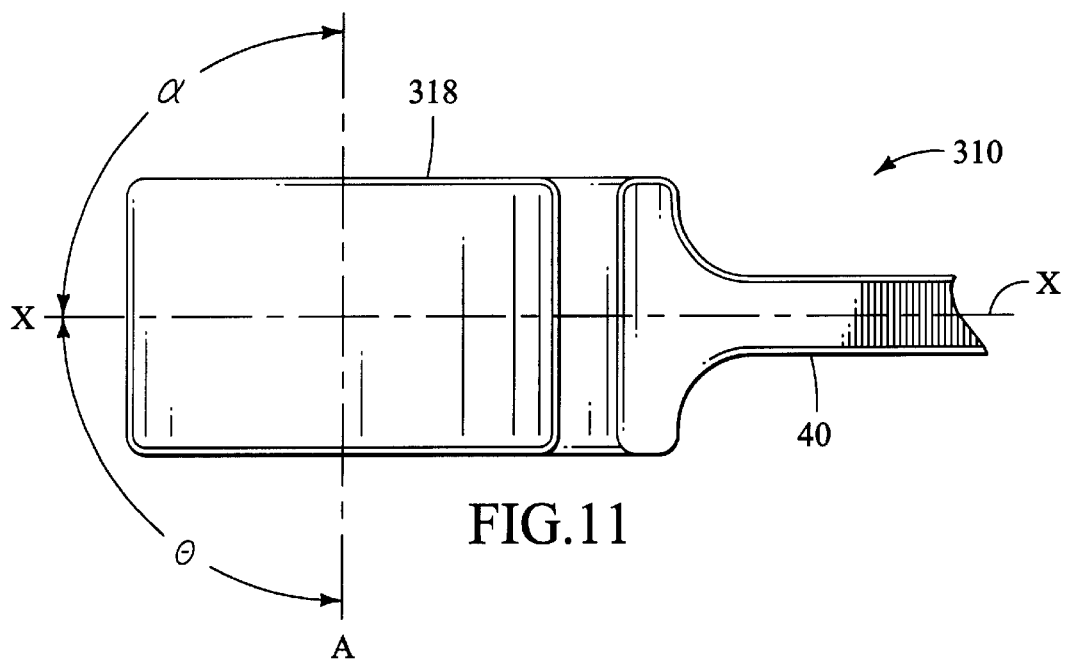
FIG. 11 is a side elevation view of the fish hook remover depicted in FIG. 10.

Another embodiment of the invention is depicted in FIG. 10, which depicts a fish hook remover 310 in a front elevation view. The hook remover 310 includes a spiral flight 318 which is attached to a shank portion 340. In this embodiment the spiral portion 318 is generated about an axis A which is essentially perpendicular to the longitudinal axis X of the shank 340. The hook remover 310 depicted in FIG. 10 should be compared to the hook remover 10 of FIG. 2. In FIG. 2, the spiral flight 18 is depicted as being generated about an axis A which is essentially parallel to the longitudinal axis of the shank 40. The angle of the flight axis A can be oriented at a number of different angles with respect to the shank axis X. Turning to FIG. 11, a right side elevation view of the hook remover 310 of FIG. 10 is depicted. As shown, axis A of the flight section 318 is oriented at an angle α of about 90 degrees with respect to the shank axis X. The angle α can be increase in the clockwise direction to about 250 degrees, at which point the flight section 318 will be doubled-back onto the shank 40. Likewise, the spiral axis A can be rotated in a counter-clockwise direction to increase angle θ from 90 degrees to about 250 degrees. Accordingly, the spiral portion 318 can be oriented at any angle with respect to the shank axis X of about plus or minus 160 degrees. Preferably, the spiral portion 318 is oriented at an angle with respect to the shank axis X of about plus or minus 80 to 110 degrees.

Figure 14:
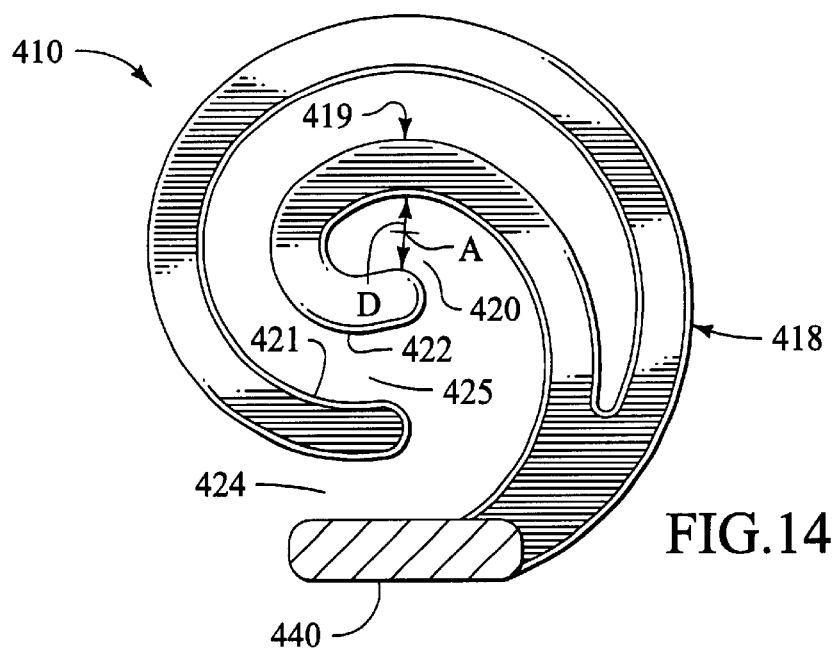
FIG. 14 is a top sectional view of an embodiment of a fish hook remover in accordance with the present invention having two concentric spiral flights.

Yet another embodiment of the present invention is depicted in FIG. 14. The view shown in FIG. 14 is similar to the views shown in FIGS. 8 and 9, that is, a sectional view through the shank portion 440 of the fish hook remover 410. The hook remover 410 comprises a first spiral flight 418 which is can be similar to the spiral flights 18 or 118 of FIGS. 3 and 8 respectively. The first spiral flight defines a line guide opening 424. The hook remover 410 further comprises a second spiral flight 419 which can be generated in the same direction and inside of the first spiral flight 418, beginning at an area at or near the shank 40. The first and second spiral flights can be generated about the same axis, or different axes. The outer surface 422 of the second spiral flight 419 passes in proximity to the interior surface 421 of the first spiral flight 418 to define a second opening 425. The second opening 425 can be sized to receive at least the line diameter, and can also be sized to receive the hook shank diameter. Preferably, the second spiral flight defines a hook shank receiving opening 420.

Figure 7:
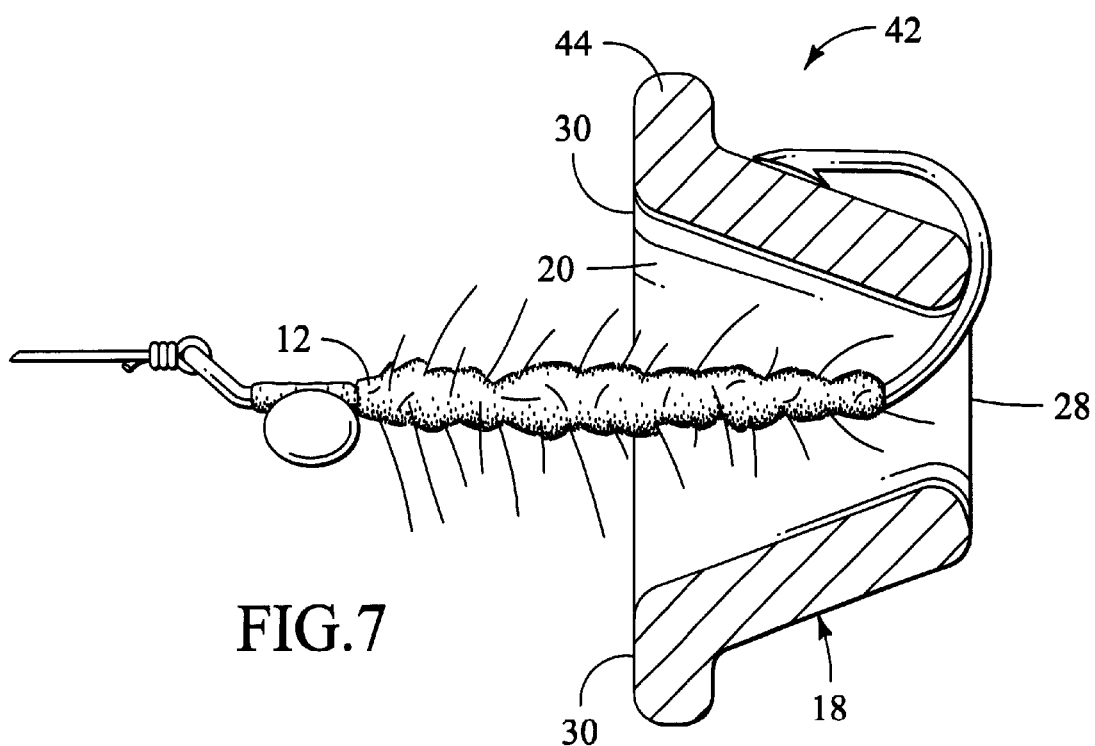
FIG. 7 is an enlarged view illustrating properties of the fish hook remover embodiment shown in FIG. 6.

Preferred embodiments of the present remover can be produced with barb concealing surfaces 42 on the flight 18. Two examples of such surfaces 42 are illustrated. In FIGS. 4 and 7, a ridge 44 is formed along the flight 18, projecting outwardly therefrom with respect to the central opening 20. To further facilitate usage of the ridge, it is preferable that the flight 18 be of a somewhat conical form as shown. FIG. 7 illustrates, the ridge 44 in relation to a hook or barb and point (hereafter barb) extending outwardly of the barb to protect against the re-hooking as the hook is removed.

Figure 6:
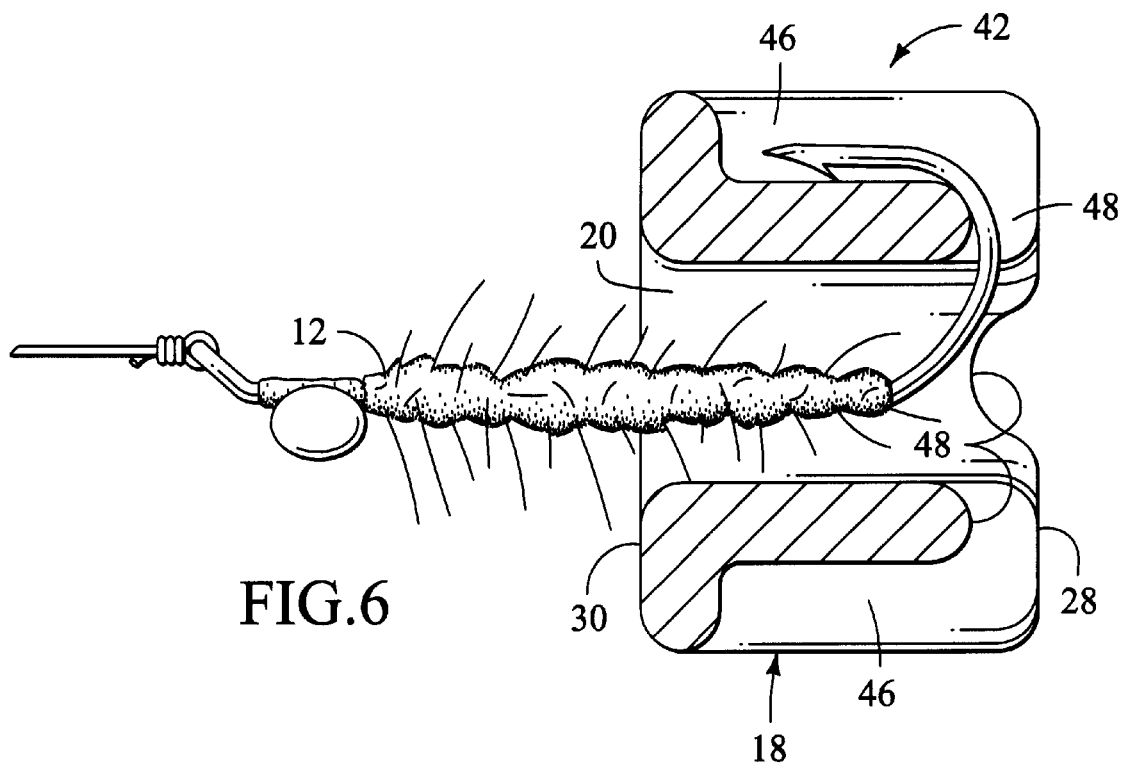
FIG. 6 is an enlarged view illustrating properties of the fish hook remover embodiment shown in FIG. 5.

In FIGS. 5 and 6 another form of barb concealing surface 42 is exemplified. Here, at least one and preferably several barb receiving indentations 46 are formed in the flight, opening outwardly with respect to the central opening 20. As shown in FIG. 6, the indentations are deep enough to receive a hook barb, also protecting against the barb from re-hooking a fish as the hook is removed. FIGS. 5 and 6 also illustrate a further aspect in which an axially oriented recess 48 on the forward surface 28 of the flight 18, leading to each barb receiving indentation 46. The recesses serve to guide or cam the hook barb toward and into the associated indentation as the hook is engaged by the forward surface 28.

Figure 12:
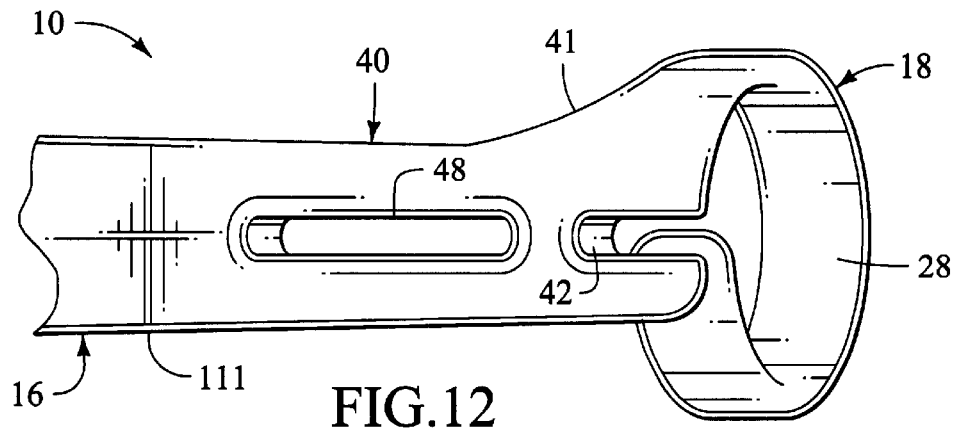
FIG. 12 is a rear view of a fish hook remover in accordance with the present invention having a hook receiving notch at the end of the shank.

The fish hook remover can be further provided with a hook shank receiving recess to facilitate arresting a fish hook in the remover as the hook is removed from a fish or the like. Turning to FIG. 12, a rear view of a fish hook remover 10 is depicted which shows the handle 16 in a rear view, and consequently, because of the offset 111 between the handle portion 1 6 and the shank portion 40, the spiral flight 18 is depicted in a side oblique view. This view is essentially the view that would be considered as the bottom view of the hook remover 10 depicted in FIG. 2. As depicted, the distal end 41 of the shank 40 makes a transition into the spiral flight itself. At this distal end 41 of the shank 40 a notch 42 is formed into the shank at the approximate beginning of the spiral flight 18. The notch 42 opens outward towards the forward surface 28 of the spiral flight 18, and is sized to receive the diameter of a fish hook shank in the notch opening. The hook receiving notch 42 thus acts to engage the shank or other parts of a hook when the apparatus 10 is used to remove a hook from a fish or the like. This engaging action helps to arrest lateral movement of the hook during the removal process, and can thus facilitate the hook removal process.

Figure 13:
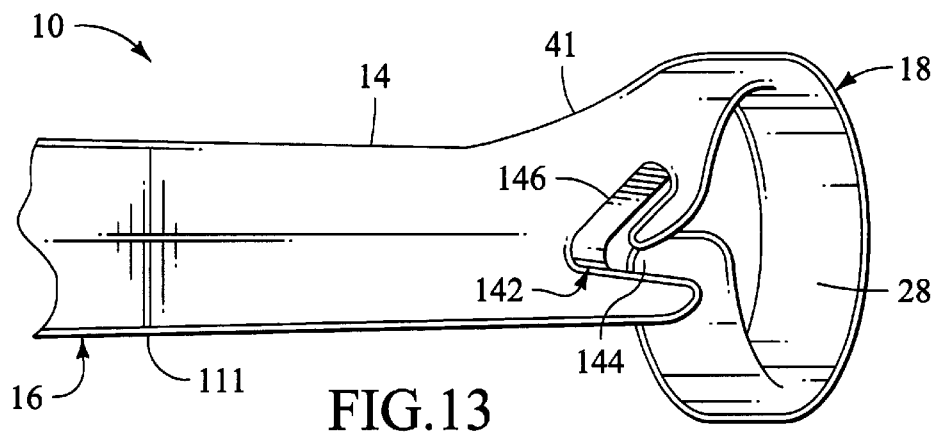
FIG. 13 is a rear view of a fish hook remover in accordance with the present invention having a modified hook receiving notch at the end of the shank.

Turning to FIG. 13, a variation on the hook shank receiving notch depicted in FIG. 12 is shown. The hook remover 10 depicted in FIG. 13 is in all aspects similar to the hook remover 10 depicted in FIG. 12, except that the hook receiving notch 142 in FIG. 13 is different than the hook receiving notch 42 of FIG. 12. In FIG. 13, the hook receiving notch 142 comprises a first hook shank receiving opening 144 which opens downwards towards the forward surface 28 of the spiral flight 18. The hook receiving notch 142 further comprises a secondary hook shank receiving slot 146 which is located towards the closed end of the first notch 142, and which is offset at an angle to the first notch 144. Both the first notch 144 and the second notch 146 are sized to receive the shank of a fish hook to be removed using the hook remover 10. Accordingly, a fish hook shank can be securely engaged in the hook shank notch 142 thus reducing the change of the hook becoming disengaged from the hook remover 10 during the hook removal process. Further, the two-notch configuration depicted in FIG. 13 allows a user to engage the hook shank itself and exert a torque on the fish hook, further facilitating removal of the hook from a fish or the like.

Returning to FIG. 12, the fish hook remover 10 can further comprise a receiving slot 48 which is disposed in the shank 40 of the hook remover 10. The slot 48 can comprise an open slot which forms an opening through the shank 40, or the slot 48 can merely comprise a recessed portion in the shank. The slot can act to engage portions of the fish hook and the hook/line assembly during removal of a hook from a fish. For example, where a line is secured by a knot to a hook at an eyelet, the eyelet and knot assembly can be received at least partially into the slot 48. Further, if the hook to be removed has a curved or bent shank portion, then the portion of the hook shank at or above the curve or bend can be received in the slot 48, thus facilitating removal of the hook from a fish or the like.

Figure 16:
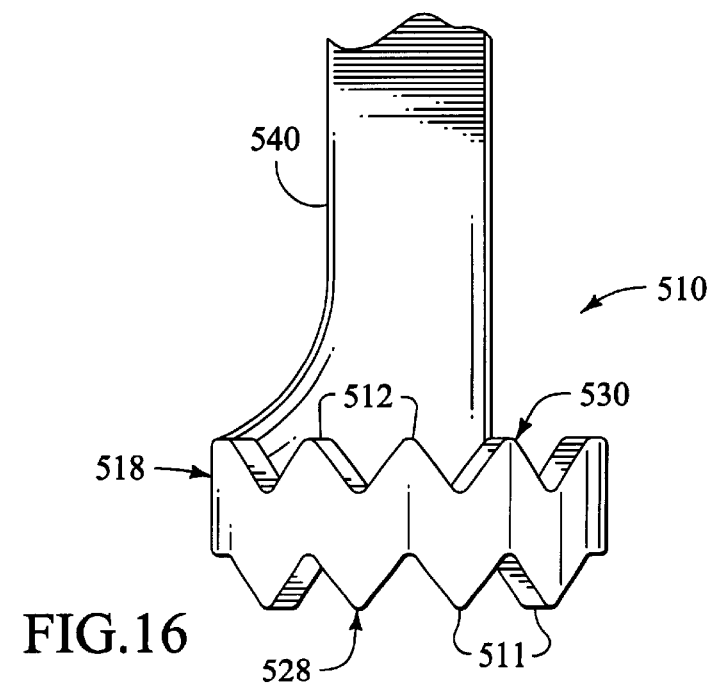
FIG. 16 is a front view of a modified spiral flight of a fish hook remover of the present invention.

With reference now to FIG. 16, a fish hook remover 510 is shown in partial front view. The fish hook remover comprises a spiral flight 518 which is attached to a shank 540 in a manner similar to the fish hook remover 10 depicted in FIG. 5. The spiral flight 518 of fish hook remover 510 of FIG. 16 has a forward surface 530 defining undulations 512, and a rearward surface 528 defining undulations 511. In a manner similar to the hook shank receiving notch 42 and the slot 48 of the hook remover 10 depicted in FIG. 12, the undulations 511 and 512 of the fish hook remover 510 can act to engage parts of a fish hook during the hook removal process, thus facilitating removal of the hook from a fish or the like.

Operation with any form of the present hook remover 10 is a simple and convenient process. First the user captures the line in the central opening 20 of the flight 18. This is done simply by grasping the handle 16 and moving the remover laterally (with respect to the line) against the fish line so the line will engage the line guide surface 32 of the spiral flight. It is pointed out that it is not necessary that the line be taut to accomplish this function.

The curvature of the line guide surface 32 will guide the line smoothly into the line guide opening 22. Continued lateral motion in the same direction will force the line along the opening 22 through the inward end 26 of the opening and into the central opening 20. This may be done as a simple movement of the user's wrist.

Next, the user simply slips the remover along the line toward the hook. The central hook shank receiving opening 20 will allow the flight 18 to be slipped over the body or shank of the hook to a point where the forward flight surface 28 engages the curve of the hook. A forward thrust or slight tipping motion of the handle will typically disgorge the hook barb, and the hook can be retracted from the fish.

If embodiments of the present remover 10 are used in which barb concealing surfaces are provided, the user may simply slide the hook outward along the same axis as the line. If such surfaces are not provided, the user can simply angle the remover 10 to hold the barb away from the adjacent tissues and hold that angle while moving the hook and remover away from the fish to avoid re-hooking.

It is pointed out that because the flight 18 preferably extends about an angle greater than 360°, that the forward flight surface 28 facing the hook is continuous. That is, there is no open slot exposed to the hook that could allow the hook to slip through during the removal process. This is a distinct advantage over prior slotted hook removers that require the user to turn the slot away from alignment with the hook for purposes of hook removal.

The above steps can take very little time (seconds) before the fish is free of the hook. In fact, there is little if any need for the fisherman to touch or even remove the fish from the water. Thus an extremely effective, quick and safe hook removal process is performed that will result in little if any injury to the fish.

Figure 15:
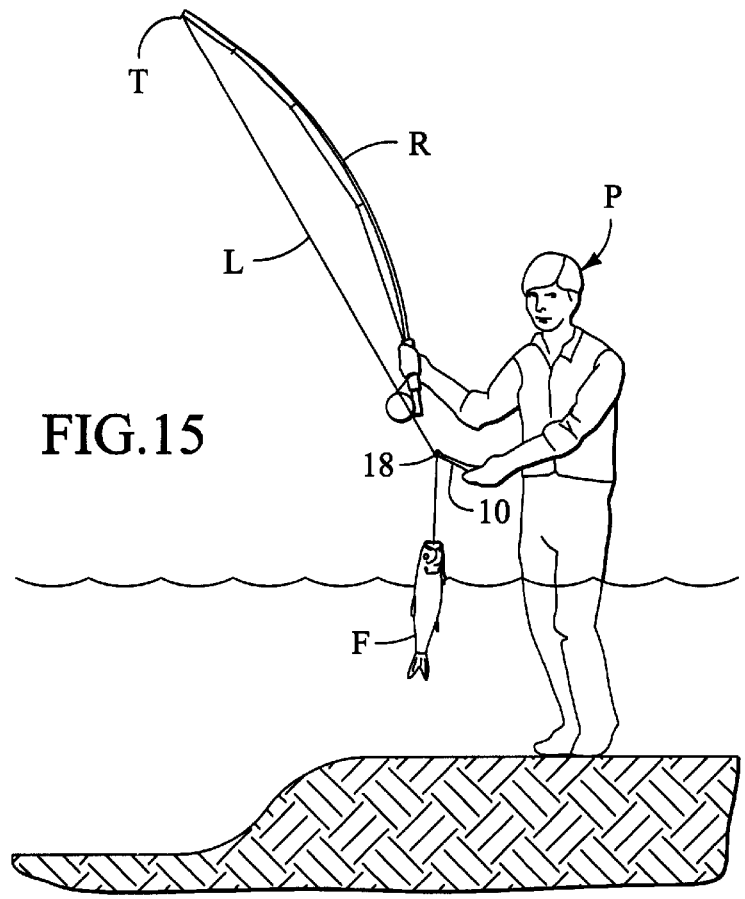
FIG. 15 depicts a method of using a fish hook remover of the present invention as a remote rod tip guide.

In addition to facilitating removal of a hook from a fish, the fish hook remover of the present invention can also be used as a remote fishing rod tip. Such a use is depicted in FIG. 15. As shown, a person P using a fishing rod R has caught a fish F. The fish F is attached to a line L via a hook (not shown). The line L is supported by the rod R, and leaves the rod at the rod tip T. Typically, the person P attempts to bring the fish F in by maneuvering the rod tip T to bring the fish closer. However, this can be a cumbersome process, as some fishing rods are quite long. By using a hook remover 10 as indicated in FIG. 15, the spiral flight 18 can act as a remote rod tip. This allows the person P to hold the rod R in a more comfortable position and bring in the fish by working the line L with the spiral flight 18 of the hook remover 10.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fish hook remover, comprising:
   a shank;
   a spiral hook engaging flight on the shank, generated about an axis offset from the shank through an angle greater than 360° and extending to and enclosing an inner end;
   wherein the flight includes a forward surface and a rearward surface axially spaced by a width dimension;
   a central hook shank receiving opening formed about the axis and defined by the spiral configuration of the flight and having a cross sectional dimension measured normal to the axis and wherein the inner end is spaced radially from and located along the axis within the spiral flight; and
   wherein the flight includes an integral line guide surface leading tangentially into the central hook shank receiving opening such that a fish line engaged by the line guide surface can be guided into the central hook shank receiving opening.

2. The fish hook remover of claim 1, and further wherein the width dimension is less than or equal to the cross sectional dimension of the hook shank receiving opening.

3. The fish hook remover of claim 1, and further wherein the spiral flight is formed in a clockwise spiral when viewed from the forward surface.

4. The fish hook remover of claim 1, and further wherein the spiral flight is formed in a counter-clockwise spiral when viewed from the forward surface.

5. The fish hook remover of claim 1, and further comprising a handle attached to the shank.

6. The fish hook remover of claim 5, and further wherein the handle is removably attached to the handle.

7. The fish hook remover of claim 1, and further wherein the shank is bent at an angle of between about 90 degrees and about 170 degrees.

8. The fish hook remover of claim 7, and wherein the shank is bent at an angle of between about 130 degrees and about 160 degrees.

9. The fish hook remover of claim 1, and further wherein:
   the axis about which the spiral flight is generated is the spiral flight axis;
   the shank defines a longitudinal shank axis corresponding to a major dimension of the shank proximate the spiral flight; and the spiral flight axis is oriented at an angle of between about 0 degrees and about 135 degrees with respect to the shank axis.

10. The fish hook remover of claim 9, and wherein the spiral flight axis is oriented at an angle of about 0 degrees with respect to the shank axis.

11. The fish hook remover of claim 9, and wherein the spiral flight axis is oriented at an angle of about 90 degrees with respect to the shank axis.

12. The fish hook remover of claim 1, and further wherein:
the spiral flight is defined by a initial end which is opposite from the free end of the spiral flight
the shank is defined by a shank distal end which makes a transition into the spiral flight initial end; and
the distal end of the shank defines a notch formed into the shank proximate the initial end of the spiral flight, the notch opening outward from the distal end of the shank towards the forward surface of the spiral flight.

13. The fish hook remover of claim 12, and further wherein the notch is defined by a notch width, and wherein the notch width is sized to receive the diameter of a fish hook shank.

14. The fish hook remover of claim 12, and wherein the notch is a primary notch, and further wherein the distal end of the shank further defines a secondary notch, the secondary notch being defined by an open end which intersects the primary notch.

15. The fish hook remover of claim 14, and wherein:
the primary notch opens outward at an open end of the notch;
the primary notch is further defined by a closed end which is opposite the open end; and
the secondary notch open end intersects the primary notch proximate the closed end of the primary notch, and the secondary notch is oriented at an acute angle with respect to the primary notch.

16. The fish hook remover of claim 1, and further wherein the shank defines a slot located at least partially above the spiral flight.

17. The fish hook remover of claim 1, and further wherein the forward surface of the spiral flight is defined by undulations in the surface.

18. The fish hook remover of claim 17, and further wherein the rearward surface of the spiral flight is defined by undulations in the surface.

19. The fish hook remover of claim 1, and further wherein the rearward surface of the spiral flight is defined by undulations in the surface.

* * * * *